US007894185B2

(12) United States Patent
Weber et al.

(10) Patent No.: US 7,894,185 B2
(45) Date of Patent: Feb. 22, 2011

(54) COLD-DRAWN HOUSING FOR ELECTRONIC DEVICE

(75) Inventors: Douglas Weber, Arcadia, CA (US); Naoto Matsuyuki, Okazaki (JP)

(73) Assignee: Apple Inc., Cupertino, CA (US)

( * ) Notice: Subject to any disclaimer, the term of this patent is extended or adjusted under 35 U.S.C. 154(b) by 191 days.

(21) Appl. No.: 12/242,032

(22) Filed: Sep. 30, 2008

(65) Prior Publication Data

US 2010/0008040 A1    Jan. 14, 2010

Related U.S. Application Data

(60) Provisional application No. 61/080,182, filed on Jul. 11, 2008.

(51) Int. Cl.
*H05K 5/00* (2006.01)
(52) U.S. Cl. .................................. 361/679.56
(58) Field of Classification Search ............. 361/679.56
See application file for complete search history.

(56) References Cited

U.S. PATENT DOCUMENTS

| 4,680,207 | A * | 7/1987 | Murray | 428/35.2 |
|---|---|---|---|---|
| 6,386,583 | B1 * | 5/2002 | Erike | 280/737 |
| 6,449,164 | B1 * | 9/2002 | Gershfeld | 361/752 |
| 7,013,164 | B2 * | 3/2006 | Lin | 455/557 |
| 7,481,897 | B2 * | 1/2009 | Erike | 147/334 |
| 7,515,431 | B1 * | 4/2009 | Zadesky et al. | 361/752 |
| 7,649,744 | B2 * | 1/2010 | Zadesky et al. | 361/752 |
| 7,660,127 | B2 * | 2/2010 | Weber et al. | 361/752 |
| 2002/0033591 | A1 * | 3/2002 | Erike | 280/43.1 |
| 2004/0074570 | A1 * | 4/2004 | Erike | 148/546 |
| 2006/0268528 | A1 * | 11/2006 | Zadesky et al. | 361/728 |

OTHER PUBLICATIONS

U.S. Appl. No. 10/884,172, filed Jul. 2, 2004.

* cited by examiner

*Primary Examiner*—Lisa Lea-Edmonds
(74) *Attorney, Agent, or Firm*—Beyer Law Group LLP

(57) ABSTRACT

A primary outer housing component for an electronic device formed via a cold-drawing process is disclosed. The electronic device can include internal operational components located within an outer housing, as well as a processor and one or more user interfaces in communication therewith. A primary outer housing component substantially surrounds and protects the internal operational components and processor, and comprises a single, continuous and seamless structural wall having a cross-sectional profile that includes an outer circumference and an inner circumference, as well as openings at a top end and bottom end thereof. Top and bottom end closures fit within and close off the top and bottom end openings in the primary outer housing component, which is formed using a cold-drawing material process that includes the use of a die to form the shape of the outer circumference and a mandrel to form the shape of said inner circumference.

20 Claims, 6 Drawing Sheets

COLD-DRAWN HOUSING FOR ELECTRONIC DEVICE

CROSS REFERENCE TO RELATED APPLICATION

This application claims priority to U.S. Provisional Patent Application No. 61/080,182, filed Jul. 11, 2008, and entitled "COLD-DRAWN HOUSING FOR ELECTRONIC DEVICE," which is incorporated herein by reference in its entirety and for all purposes.

TECHNICAL FIELD

The present invention relates generally to portable computing or other personal devices, and more particularly to the formation of outer housings for such portable computing or other personal devices.

BACKGROUND

Portable computing devices, such as laptop computers, media players, and cellular telephones are becoming increasingly smaller, lighter and more powerful. The ability to fabricate various components of these devices in smaller and smaller sizes, while still maintaining or increasing the power and or operating speed of such devices, has contributed greatly to this trend. Unfortunately, the trend of smaller, lighter and more powerful portable computing devices presents a continuing design challenge in the actual formation of some components for these devices.

One design challenge associated with such portable computing devices is the formation of the enclosures used to house the various internal components of the portable computing devices. This design challenge generally arises from two conflicting design goals—the desirability of making the enclosure lighter and thinner, and the desirability of making the enclosure stronger and more rigid. The lighter enclosures, which typically use thinner plastic structures and fewer fasteners, tend to be more flexible and therefore have a greater propensity to buckle and bow when used, while the stronger and more rigid enclosures, which typically use thicker plastic structures and more fasteners, tend to be thicker and carry more weight. Unfortunately, increased weight may lead to user dissatisfaction, and bowing may damage the internal parts of the portable computing devices.

Furthermore, in most portable computing devices, the enclosures are mechanical assemblies having multiple parts that are screwed, bolted, riveted, or otherwise fastened together at discrete points. For example, the enclosures typically have included an upper casing and a lower casing that are placed on top of one another and fastened together using screws. These techniques typically complicate the housing design and create aesthetic difficulties because of undesirable cracks, seams, gaps or breaks at the mating surfaces and fasteners located along the surfaces of the housing. For example, a mating line surrounding the entire enclosure is produced when using an upper and lower casing. Not only that, but assembly is often a time consuming and cumbersome process, requiring some general technical skill.

Some solutions to these issues have involved the use of an outer housing that is tubular in nature. Such tubular outer housings can be used on, for example the iPod® media player or iPhone® cellular telephone made by Apple Inc., among other suitable portable computing devices or items. One drawback to a common approach of manufacturing such a generally tubular outer housing for a portable computing device is that the process typically involves extruding a heated material and hot-working that material to form the outer housing. Such a hot-working process has a number of inherent problems, including the need to cool the material, the tendency of the material to deform or "wobble" from the desired shape while it is hot, and a resulting relatively rough surface finish that typically must be reworked to result in a smoother finish, among other issues.

While many designs and methods of manufacture for providing outer housings on portable computing devices and other similar items have generally worked well in the past, there is always a desire to provide new and improved designs that result in aesthetically pleasing and functional outer housings for such portable computing devices, as well as improved ways of making such outer housings.

SUMMARY

It is an advantage of the present invention to provide a generally tubular outer housing for an electronic device that can be manufactured in ways that do not require a heated extrusion process. This can be accomplished at least in part through the use of a cold-drawing process to form the outer housing, which results in a cold-drawn raw product that does not need to cool down, does not materially deform or "wobble" after the rough formation process, has an improved surface finish, and can be made to tighter tolerances than a similar product that is formed through a traditional heat-extrusion process.

In various embodiments, the invention can include a portable personal computing device having a plurality of internal operational components adapted to provide processing for a user thereof, and an outer housing that surrounds and protects the internal operational components.

The outer housing can include a single, continuous, seamless and tubular-type structural wall having a cross-sectional profile that includes an outer circumference and an inner circumference, and the outer housing can also have openings at a top end and bottom end. In particular, the outer housing can be formed using a cold-drawing material process that includes the use of a die to form the outer shape of the outer circumference and a mandrel to form the inner shape of the inner circumference.

In some embodiments, the mandrel may not be desired or necessary to shape the inner circumference or cavity of the generally tubular-type housing. If used, the inner mandrel can be a "floating" mandrel that is not supported by any structure beyond the housing material that is being cold worked. Such a floating mandrel can generally self-center itself and remain in a relatively set and stable position during the cold-drawing process, depending upon the masses, densities and shapes of the outer die, mandrel and cold-worked material. For such a floating mandrel embodiment, the mandrel can be larger than the opening in the die through with the worked material is cold drawn. Alternatively, the mandrel can be affixed to a support structure to hold it in place with respect to the outer die during the cold-drawing process. As yet another embodiment, the inner mandrel can be elongated with a smaller cross-section than the opening in the outer die through which the cold worked material is drawn. Such a moving mandrel can then be pulled through the die opening with the worked material. In such an embodiment, a lubricant may be used to enable the separation of the mandrel from within the cold-worked material (i.e., outer housing) after it has been formed.

Other apparatuses, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and arrangements for the disclosed inventive apparatus and method for providing an outer housing for a personal computing device by using a cold-drawing formation process. These drawings in no way limit any changes in form and detail that may be made to the invention by one skilled in the art without departing from the spirit and scope of the invention.

DETAILED DESCRIPTION

Figure 1:
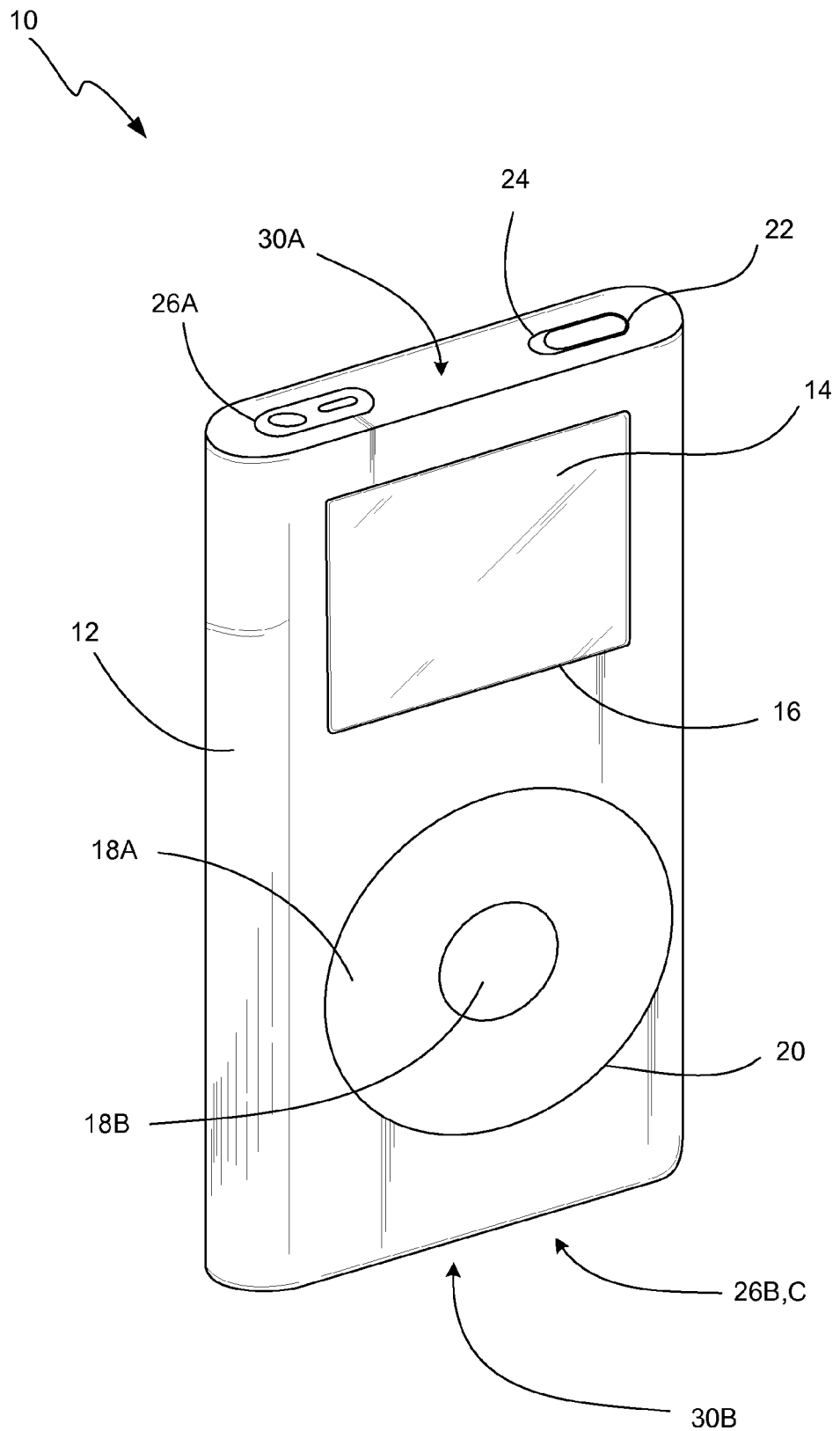
FIG. 1 illustrates in front perspective view an exemplary handheld personal computing device according to one embodiment of the present invention.

Exemplary applications of apparatuses and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following examples should not be taken as limiting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting; such that other embodiments may be used, and changes may be made without departing from the spirit and scope of the invention.

The invention relates in various embodiments to aesthetically pleasing outer housings for a portable personal computing device, such as an iPod® media player or iPhone® cellular telephone made by Apple Inc. of Cupertino, Calif., among other suitable devices or items. Such outer housings can be generally tubular-type or shaped housings in nature, such that a continuous and seamless "tube" or "ring" like cross-section is formed for the housing. Although the terms tubular-type and tubular shaped housing are used herein, it will be readily understood that such terms can refer to any housing structure with a cross-section that is continuous and seamless, and not just a generally circular or oval shaped cross-section.

In various embodiments of the present invention, a primary outer housing component for a portable personal computing device is provided. Various embodiments may also include or relate to the entire portable personal computing device. The primary outer housing component or "shell" can be adapted to surround and protect a plurality of internal operational components for the computing device, such as a processor, user interface components and the like. The primary outer housing component can include a single, continuous and seamless structural wall having a cross-sectional profile that includes an outer circumference and an inner circumference, and may also include openings at a top end and bottom end thereof, such that the primary outer housing component is generally tubular in shape. Further more general embodiments may include housings for items that are not computing devices, and can even include parts that are not necessarily housings.

Various examples of and methods of manufacturing such tubular outer housings can be found in, for example, commonly owned U.S. patent application Ser. Nos. 10/884,172 and 11/501,184, filed on Jul. 2, 2004, and Oct. 7, 2006 respectively, both of which are entitled "HANDHELD COMPUTING DEVICE," and both of which are incorporated by reference herein in their entireties and for all purposes. In various embodiments of the present invention, this primary outer housing component, or any other substantially similar part for any device, can be formed using a cold-drawing material process that includes the use of an outer die to form the outer shape of the outer circumference and an inner mandrel to form the inner shape of the inner circumference.

Electronic Device

Referring first to FIG. 1, an exemplary handheld personal computing device is shown in front perspective view. Handheld personal computing device 10 is preferably capable of processing data, and more particularly media such as audio, video, images, text, messages, and the like. By way of example, computing device 10 may generally correspond to a music player, game player, video player, camera, cell phone, personal digital assistant (PDA), and/or the like. With regards to being handheld, the computing device 100 can be operated solely by the user's hand(s), such that no desktop or other reference surface is needed. In some cases, the handheld device is sized for placement into a pocket of the user. By being pocket sized, the user does not have to directly carry the device and therefore the device can be taken almost anywhere the user travels (e.g., the user is not limited by carrying a large, bulky and heavy device). In the illustrated embodiment, the computing device 10 is a pocket sized hand held music player that allows a user to store a large collection of music. By way of example, the music player may correspond to the iPod® series MP3 players made by Apple, Inc. of Cupertino, Calif.

As shown, the computing device 10 includes a primary outer housing component 12 that encloses and supports internally various electrical components (including integrated circuit chips and other circuitry) to provide computing operations for the device. The integrated circuit chips and other circuitry may include a microprocessor, hard drive, Read-Only Memory (ROM), Random-Access Memory (RAM), a battery, a circuit board, and various input/output (I/O) support circuitry. In addition to the above, the primary outer housing component 12 may also substantially define the shape or form of the device 10. In this particular example, the primary outer housing component 12 extends longitudinally and has a pill like cross section. The size and shape of the primary outer housing component 12 can preferably be dimensioned to fit comfortably within the hand of a user. In some cases, this primary outer housing component can be formed from a hot extruded material, such as aluminum, thereby providing a seamless look along the length of the device 10. That is, unlike conventional housings, the primary outer housing component or shell 12 does not include any breaks between the top and bottom ends, thereby making it stronger and more aesthetically pleasing. Alternatively, this primary outer housing component 12 can be formed by way of a cold-drawing process, as set forth in greater detail below.

Computing device 10 can also include a display screen 14. The display screen 14, which is assembled within the primary outer housing component 12 and which is visible through an opening 16 in the housing 12, is used to display a graphical user interface ("GUI") as well as other information to the user (e.g., text, objects, graphics). By way of example, the display screen 14 may be a liquid crystal display ("LCD"). In some cases, the housing 12 may include a window, which is positioned in the opening in front of the display in order to protect the display from damage. The window is typically formed from a clear material, such as clear polycarbonate plastic. Computing device 100 can also include one or more input devices 18 configured to transfer data from the outside world into the computing device 10. The input devices 18 may, for example, be used to perform tracking/scrolling, to make selections or to issue commands in the computing device 10. By way of example, the input devices 18 may correspond to keypads, joysticks, touch screens, touch pads, track balls, wheels, buttons, switches, and/or the like. In the illustrated embodiment, the computing device 10 includes a touch pad 18A and one or more buttons 18B, which are assembled within the housing 12 and which are accessible through a second opening 20 in the housing 12.

Computing device 10 may also include one or more switches 22, including power switches, hold switches, and the like. The illustrated power switch 22 can be configured to turn the device 10 on and off, while a hold switch can be configured to activate or deactivate the touch pad 18A and/or buttons 18B, for example. Like the touch pad 18A and buttons 18B, the switches 22 are accessible through a third opening 24 in the housing 12. Computing device may also include one or more connectors or interfaces 26 for transferring data and/or power to and from the device 10. In the illustrated embodiment, the computing device 10 includes an audio jack 26A, a data port 26B and a power port 26C. In some cases, the data port 26B may serve as both a data and power port thus replacing a dedicated power port 26C. A data port such as this is described in greater detail in pending U.S. patent application Ser. No. 10/423,490, which is herein incorporated by reference. Other input and output interfaces can be included as may be desired, as will be readily appreciated.

Since the primary outer housing component 12 is generally tubular shaped with openings at the top and bottom thereof, a pair of end closures 30 can be used to seal off the internal components from the outside environment. Top end closure 30A and bottom end closure 30B can be generally sized to fit within the top and bottom openings in primary outer housing component 12, and can be sealed therewith via a firm press-fit, adhesive, caulking, gasket arrangement, or other suitable sealing means, as may be desired. As shown, both end closures 30A, 30B can have various openings 26A, 26B, 26C therein, as may be desired.

Figure 2:
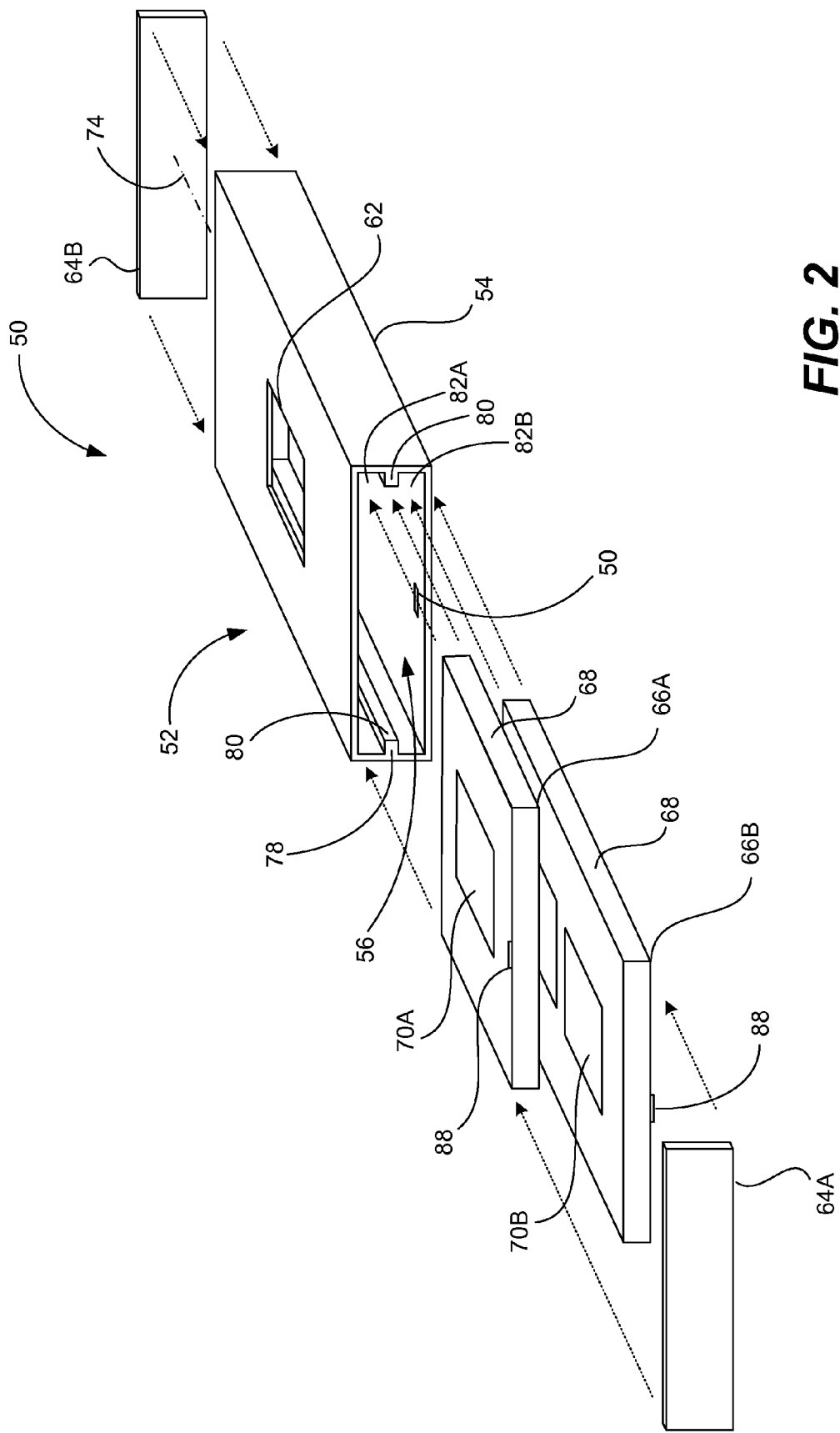
FIG. 2 illustrates in exploded side perspective view an exemplary handheld personal computing device according to one embodiment of the present invention.

Continuing to FIG. 2, an exemplary handheld personal computing device is shown in exploded side perspective view. Handheld personal computing device 50 can be substantially similar to computing device 10 above, although details may vary within the scope of the present invention, as will be readily appreciated. Similar to the foregoing example, computing device 50 may be sized for one-handed operation and placement into small areas such as a pocket, and can be, for example, an iPod®, iPhone® or other similar personal computing device.

Computing device 50 includes a housing 52 that encloses and supports internally various electrical components (including for example integrated circuit chips and other circuitry) to provide computing operations for the device 50. The housing 52 also defines the shape or form of the device 50. That is, the contour of the housing 52 may embody the outward physical appearance of the device 50. The housing 52 generally includes a primary outer housing component 54 in the form of an integral tube. By integral, it is meant that the primary outer housing component is a single complete unit. By being integrally formed, the primary outer housing component 54 is structurally stronger than conventional housings, which typically include two or more parts that are fastened together. Furthermore, unlike conventional housings that can have seams between two or more parts, this primary outer housing component 54 has a substantially seamless appearance. Moreover, the seamless housing prevents contamination and is more water resistant than conventional housings.

Because of the tube like configuration, the primary outer housing component 54 defines a cavity 56 therethrough between a first open end 58 and second open end 60 located opposite the first open end 58. The primary outer housing component 54 also includes one or more windows 62, which provide access to the electrical components, particularly the user interface elements, when they are assembled inside the cavity 56 of the primary outer housing component 54.

In order to seal the primary outer housing component 54, the housing 52 additionally includes a pair of end closures or caps 64A and 64B. Each of these end closures or caps 64 is configured to cover one of the open ends 58 or 60, thereby forming a fully enclosed housing system. The end caps or closures 64 may be formed from similar or different materials as the primary outer housing component 54. Furthermore, the end caps 64 may be attached to the primary outer housing component 54 using a variety of techniques, including but not limited to, fasteners, glues, snaps, and/or the like. In some cases, the end caps 64 may be positioned on the surface of the open ends 58 and 60. If so, they typically have the same shape as the outer periphery of the primary outer housing component 54. In order to eliminate gaps, cracks or breaks on the front and side surfaces, the end caps or closures 64 may alternatively be placed inside the cavity 56 at each of the ends. In this arrangement, the outer periphery of the end cap 64 generally matches the inner periphery of the primary outer housing component 54. This implementation is typically preferred in order to form a housing 52 with a uniform and seamless appearance (i.e., no breaks when looking directly at the front, back or side of the housing).

The cross sectional shape, including both the outer and inner shapes, of the primary outer housing component 54 may be widely varied. They may be formed from simple or intricate shapes whether rectilinear and/or curvilinear. For hand held devices, it is typically preferred to use a shape that better fits the hand (e.g., form fits). By way of example, a rectangle with curved edges or an oval or pill shaped cross section having curvature that more easily receives the hand may be used. It should be noted that the inner cross sectional shape may be the same or different from the external cross sectional shape of the main body. For example, it may be desirable to have a pill shaped external and a rectangularly shaped interior, among other possibilities. In addition, although not a requirement, the front surface of the primary outer housing component 54 may be substantially planar for placement of one or more displays and/or user interfaces on the personal computing device 50.

Computing device 50 can also include one or more electronic subassemblies 66. The subassemblies 66 each include a carrier 68 and one or more operational components 70 of the electronic device 50. The carrier 68 provides a structure for carrying the operational components 70 and supporting them when assembled inside the housing 52. By way of example, the carrier 68 may be formed from plastics, metals and/or a printed circuit board ("PCB"). The operational components 70, on the other hand, perform operations associated with the computing device 50. The operational components 70 may for example include user interface elements 70A and/or circuit elements 70B. The user interface elements 70A allow a user to interact with the computing device 50. By way of example, the user interface elements 70A may correspond to a display and/or an input device such as a keypad, touch pad, touch screen, joystick, trackball, buttons, switches and/or the like. The circuit components 70B, on the other hand, perform operations such as computing operations for the computing device 50. By way of example, the computing components 70B may include a microprocessor, memory, hard drive, battery, I/O connectors, switches, power connectors, and/or the like.

During assembly, the subassemblies 66 are positioned inside the cavity 56 of the primary outer housing component 54. In particular, the subassemblies 66 are inserted into one of the open ends 58 or 60 of the primary outer housing component 54 mainly along a longitudinal axis 74 of the primary outer housing component 54 to their desired position within the housing 52. Once positioned inside the cavity 56, the end caps 64 of the housing 52 may be attached to the primary outer housing component 54 in order to fully enclose the housing 52 around the subassemblies 66. In most cases, the user interface elements 70A are positioned relative to the window opening 62 so that a user may utilize the user interface elements 70A. By way of example, the window 62 may allow viewing access to a display or finger access to a touch pad or button.

In order to more efficiently assemble the electronic subassemblies 66 inside the cavity 56, the device 50 may include an internal rail system 78 disposed inside the cavity 56 of the primary outer housing component 54. In most cases, the internal rail system 78 is integrally formed with the primary outer housing component 54 (i.e., formed as a single part). The internal rail system 78 is configured to receive the various subassemblies 66 and guide them to their desired position within the primary outer housing component 54 when the subassemblies 66 are inserted through one of the open ends 58 or 60. The internal rail system 78 enables the subassemblies 66 to be easily and quickly assembled within the device 50. For example, the rail system 78 provides for insertion (or removal) with minimal effort and without tools. The internal rail system 78 also helps support and store the subassemblies 66 in an organized manner within the device 50. By way of example, the rail system 78 may store the subassemblies 66 in a stacked parallel arrangement thereby using available space more efficiently.

In the illustrated embodiment, the rail system 78 includes at least one set of opposed rails 80, each of which extends longitudinally through the cavity 56 and each of which protrudes from the inner sides of the primary outer housing component 54, preferably integrally formed with this outer housing component. The rails 80 are configured to receive the subassembly 66 and cooperate to guide subassemblies 66 to their desired position within the housing 52. The internal rails 80 generally allow the subassemblies 66 to be slid into the cavity 56 through the open ends 58 or 60 following the longitudinal axis 74 of the primary outer housing component 54. That is, the subassemblies 66 and more particularly the carrier 68 are capable of sliding in and out of the housing 52 along one or more surfaces of the rails 80.

The portion of the subassemblies 66 that engages the rails 80 may be a surface of the subassemblies or alternatively one or more posts or mounts that extend outwardly from the subassemblies 66. Furthermore, the reference surfaces for the opposed rails 80 may be positioned in the same plane or they may be positioned in different planes. The configuration generally depends on the configuration of the subassemblies 66. By way of example, in some cases, the subassemblies 66 may have a cross section that is stepped rather than completely planar. In cases such as these, the opposed rails 80 have references surfaces in different planes in order to coincide with the stepped cross section. Moreover, although typically continuous between the ends, each of the rails 80 may be segmented or include removed portions as for example at the ends for placement of the flush mounted end caps.

The width of the rails 80 may be widely varied. For example, they may be one integral piece that extends entirely from one side to the other, or they may be separate pieces with a gap located therebetween (as shown). The position and cross sectional dimensions and shapes of each of the rails may also be widely varied. The size and shape as well as the position of the rails 80 generally depends on the configuration of the sub assemblies 66. The rails 80 may have the same shape and size or they may have different shape and size. In most cases, the size and shape is a balance between keeping them as small as possible (for weight and space requirements) while providing the required reference surface and ample support to the subassemblies 66.

To elaborate, the rails 80 define one or more channels 82 that receive the one or more subassemblies 66. In the illustrated embodiment, the rails 80 along with the primary outer housing component 54 define a pair of channels, particularly an upper channel 82A and a lower channel 82B. The upper channel 82A receives a first subassembly 66A and the lower channel 8B receives a second subassembly 66B. It should be noted, however, that this is not a limitation and that additional sets of rails 80 may be used to produce additional channels 82. It should also be noted that although only one subassembly 66 is shown for each channel 82 this is not a requirement and that more than one subassembly 66 may be inserted into the same channel 82. Moreover, it should be noted that the subassemblies are not limited to being fully contained with a single channel and that portions of a subs assembly may be positioned in multiple channels. For example, the second subassembly 66B, which is positioned in the lower channel 82B, may include a protruding portion that is positioned through the rails 80 and into the upper channel 82A.

The channels 82 generally include an entry point and a final point. The entry point represents the area of the channel 82 that initially receives the subassemblies 66, i.e., the area proximate the ends of the primary outer housing component 54. The final point, on the other hand represents the area of the channel 82 that prevents further sliding movement. The final point may for example set the final mount position of the sub assemblies 66 within the housing 52. The final point may for example correspond to an abutment stop. The abutment stop may be integral with the primary outer housing component 54 or a separate component. By way of example, the abutment stop may correspond to one more posts that are mounted inside the cavity 56 on the inside surface of the primary outer housing component 54 at a predetermined distance along the longitudinal axis 74.

In order to prevent the subassemblies 66 from sliding once assembled, the interface between the subassemblies 66 and housing 52 may include a locking or securing mechanism. The locking mechanism 86 generally consists of two parts, a housing side locking feature and a subassembly side locking feature that are cooperatively positioned so that when the subassembly 66 is inserted into the housing 52, the locking features engage with one another thus holding the subassembly 66 in its desired position within the housing 52. In most cases, the locking features are configured to provide quick and easy assembly of the subassembly into the housing without the use of tools. The locking features may correspond to snaps, friction couplings, detents, flexures and/or the like. Alternatively or additionally, the assemblies 66 may be attached to the primary outer housing component 54 with fasteners or adhesives.

In the illustrated embodiment, the subassemblies 66 can each include a flexure tab 88 that engages a recess 90 located on an inner surface of the primary outer housing component 54. When the subassembly 66 is slid into the housing 52, the tab 88 snaps into the recess 90 thereby securing the subassembly 66 at a predetermined position along the longitudinal axis 74. That is, because the tabs 88 flex, they allow the subassemblies 66 to pass when pushed into the cavity 76. When the subassemblies 66 pass over the recess 90, the tabs 88 resume their natural position thereby trapping the subassemblies 66 in the channel 82 between the locking tab/recess 88/90 and the abutment stop at the end of the channel 82. Using this arrangement, the subassemblies 66 are prevented from sliding out of the channels 82 on their own. In order to remove the subassembly 66, a user simply lifts the tab 88 away from the recess 90 while pulling on the subassembly 66. The recess 90 and abutment stop may cooperate to set the final position of the subassembly 66 in the cavity 56 of the primary outer housing component 54. For example, the recess and abutment stop may be configured to position the user interface elements 70A directly behind the window opening 62 so that a user has full access to the user interface elements 70A.

As noted above, the primary outer housing component 54, which may include the internal rails 80 (or other internal features), can be formed in some cases via an extrusion process. Such an extrusion process is generally capable of producing an integral tube without seams, cracks, breaks, or the like. As is generally well known, extrusion is a shaping process where a continuous work piece is produced by forcing molten or hot material through a shaped orifice, (i.e., the extrusion process produces a length of a particular cross sectional shape). The cross sectional shape of the continuous or length of work piece is controlled at least in part on the shaped orifice. As the shaped work piece exits the orifice, it is cooled and thereafter cut to a desired length. As should be appreciated, the extrusion process is a continuous high volume process that produces intricate profiles and that accurately controls work piece dimensions (which can be a necessity for smaller parts). In such instances, primary outer housing component 54 may be formed from a variety of extrudable materials or material combinations including, but not limited to, metals, metal alloys, plastics, ceramics and/or the like.

Cold-Drawn Housing

According to various embodiments of the present invention, the foregoing "shell" or primary outer housing component 54 might also be formed by using a cold-drawn material forming process. Such a cold-drawing process can result in better shape control for the primary outer housing component, tighter tolerance realizations, the ability to form thinner walls, and generally improved surface finishes with respect to similar housing components formed primarily from a heated extrusion process. In some embodiments, a heated extrusion process can be used to form the general shape of the primary outer housing component 54, with a cold-drawing process then being used as a fine-tuning step to form a more refined primary outer housing component.

Figure 3:
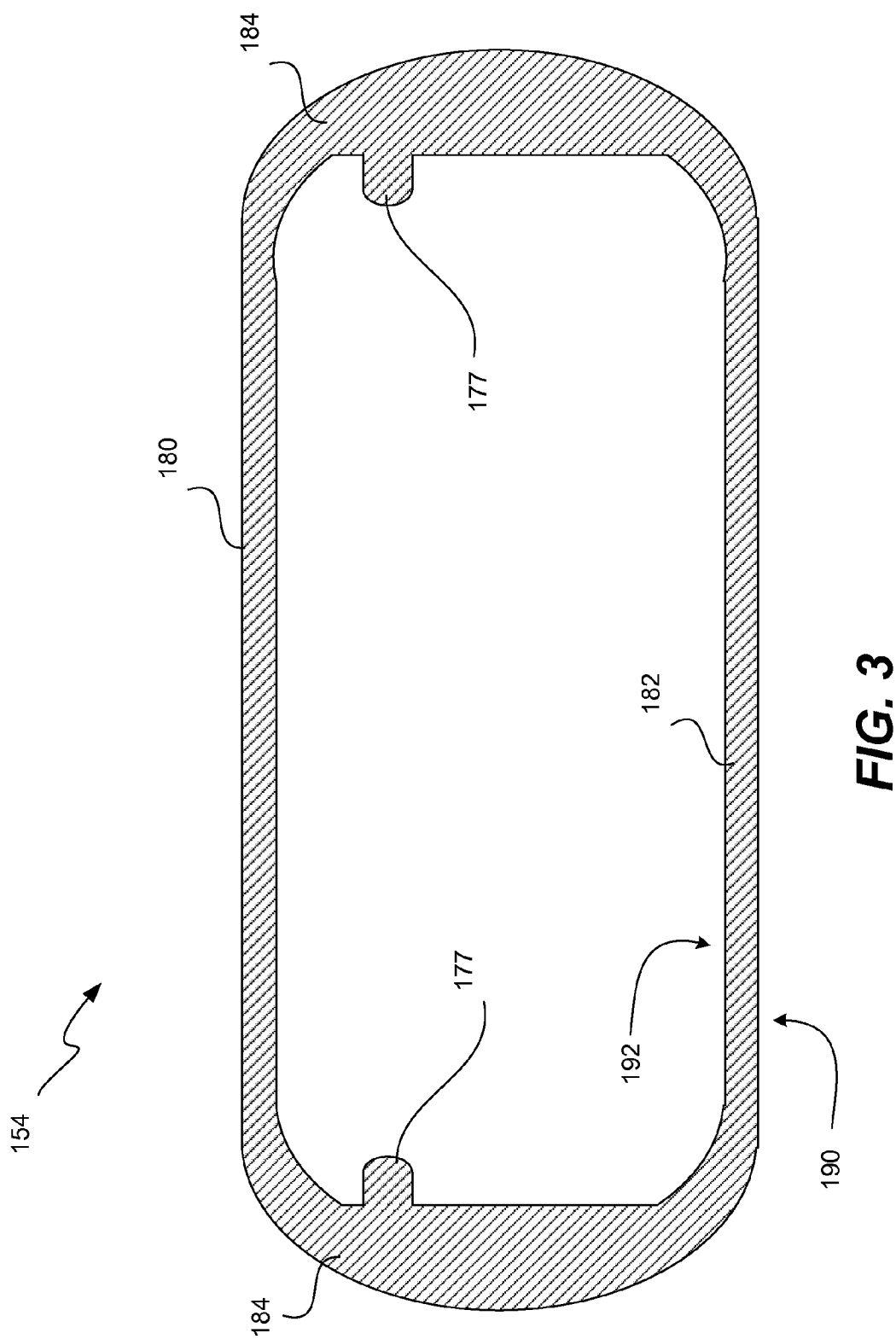
FIG. 3 illustrates in side cross-sectional view an exemplary primary outer housing component for a handheld personal computing device according to one embodiment of the present invention.

Turning next to FIG. 3, an exemplary primary outer housing component for a handheld personal computing device formed according to one embodiment of the present invention is shown in side cross-sectional view. Primary outer housing component 154 can be the same or substantially similar to primary outer housing component 12 or 54 from the forgoing examples. As shown, primary outer housing component 154 generally has a continuous shape that forms front and back walls 180, 182 and side walls 184. Similar to the foregoing example, each side wall 184 can include one or more rails 177 integrally formed therein. Primary outer housing component 154 can also include a continuous outer circumference or surface 190, as well as a continuous inner circumference or surface 192. This continuous inner circumference or surface 192 can include the shapes of one or more rails 177.

Figure 4A:
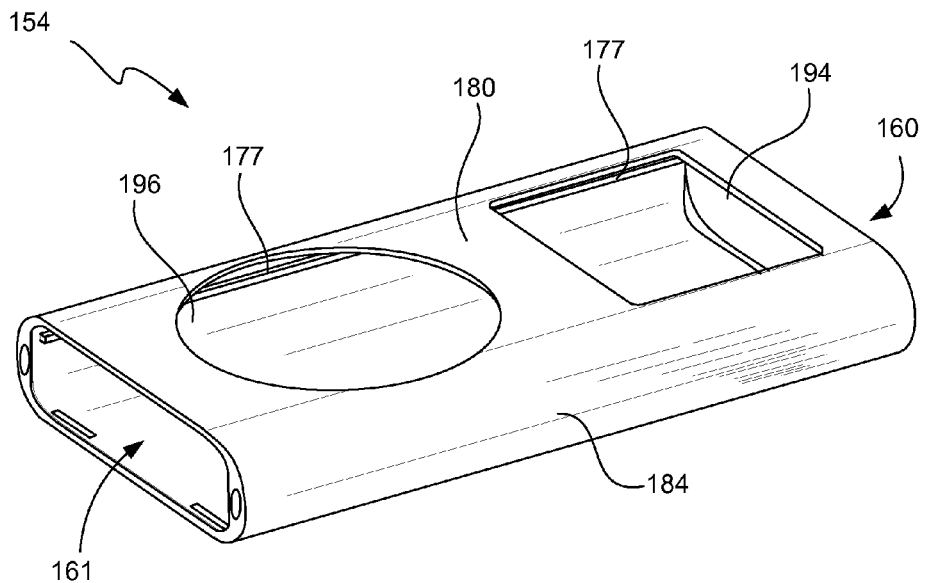
FIG. 4A illustrates in top perspective view the exemplary primary outer housing component of FIG. 3 having additional features formed therein according to one embodiment of the present invention.
Figure 4B:
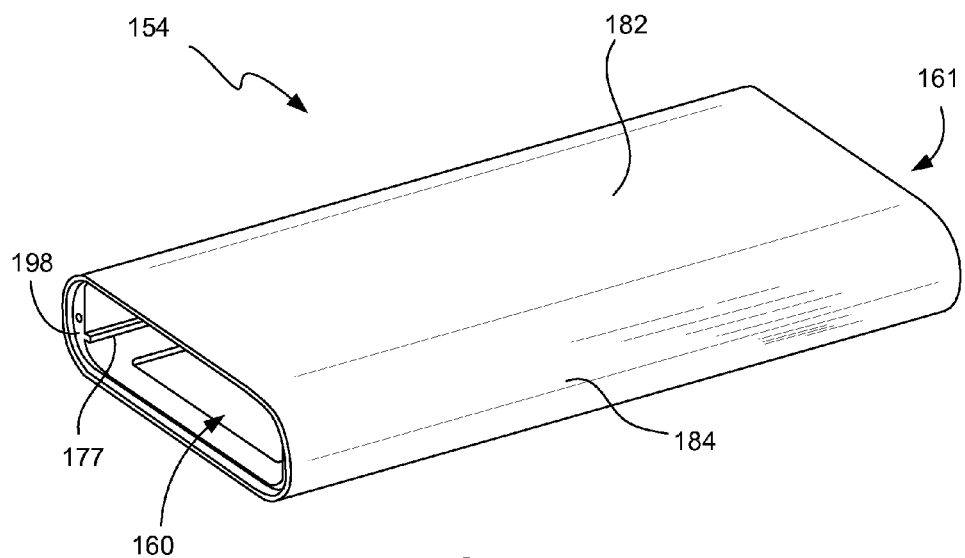
FIG. 4B illustrates in bottom perspective view the exemplary primary outer housing component of FIG. 3 having additional features formed therein according to one embodiment of the present invention.

Continuing with FIGS. 4A and 4B, the primary outer housing component of FIG. 3 having additional features formed therein is shown in top and bottom perspective views. As shown, the primary outer housing component 154 can include a front wall 180, a back wall 182 and rounded side walls 184. Access openings 194 and 196 for one or more input or output devices or features can be formed in the front wall 180. The rails 177, which extend substantially through the cavity inside the primary outer housing component 154, can be located in an opposed relationship therewithin. The rails 177 can protrude away from sidewalls 184, and can be positioned closer to the front wall 180 than the back wall 182.

Primary outer housing component 154 can include an open top end 160 as well as an open bottom end 161, for which various types of enclosures can be used to seal the entire device when assembled. Open end 160 at the top of the primary outer housing component 154 can include a recess 220 for receiving a top plate, top end cap and/or other enclosure components (not shown). The recess 220 essentially forms a lip to which such a top plate, cap and/or other closure components can be secured. Open end 161 at the bottom of the seamless enclosure 154 can include a cut out section for receiving a bottom plate, bottom end cap and/or other enclosure components (not shown). Such a cut out section can be formed by shortening the ends of the rails 177, for example. A plurality of slots for receiving flexure arms of an enclosure might also be included. Various other ways of including features to aid in the use of end enclosures can be used as well, and it is specifically contemplated that any and all such enclosure variations and features can be used with the various primary outer housing components disclosed herein.

There are numerous advantages that can be realized in using a cold-drawing formation process to manufacture the primary outer housing component of the foregoing examples. As is generally known in the art, an extrusion process can be heated (e.g., at 500 degrees Centigrade), and can involve the pressing or pushing of worked material through a die opening. Conversely, a cold-drawing process can be done at room temperature or thereabouts, and can involve the drawing or pulling of worked material through a die opening. Various advantages of a cold-drawing process can include greater precision in the final outer housing dimensions, a smaller minimum thickness for the outer housing walls, greater structural strength for the outer housing walls, and smaller defects on the surface finish of the outer housing walls, such that a less rigorous finishing process is required, among other advantages.

Figure 5A:
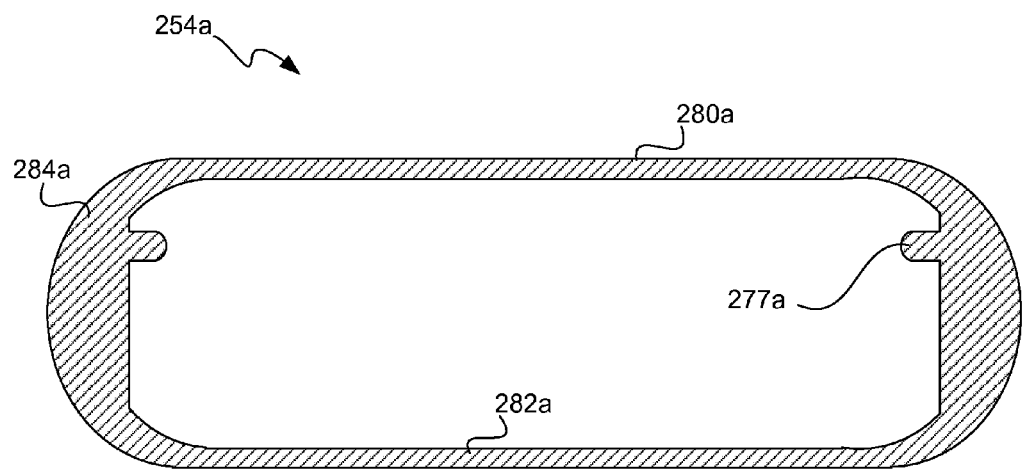
FIG. 5A illustrates in side cross-sectional view an exemplary primary outer housing component for a personal computing device immediately after the primary outer housing component has been through a heated extrusion process.

Turning next to FIG. 5A, a primary outer housing component for a personal computing device immediately after the primary outer housing component has been through a heated extrusion process in shown in side cross-sectional view. As shown, a primary outer housing component 254a for a portable personal computing device (e.g., an iPod®) can have a front wall 280a, a back wall 282a, side walls 284a and rails 277a, among other features. Primary outer housing component 254a and its accompanying features can be substantially similar in nature to the foregoing exemplary primary outer housing components, only that this primary outer housing component 254a is formed via a heated extrusion process.

Figure 5B:
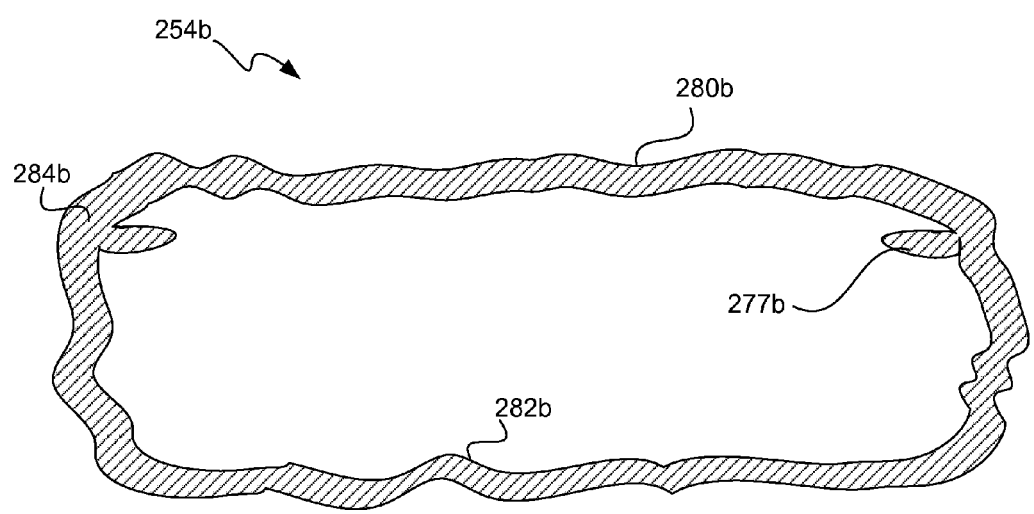
FIG. 5B illustrates in side cross-sectional view the primary outer housing component for a personal computing device of FIG. 5A after the primary outer housing component has been allowed to cool for some time after the heated extrusion process.

FIG. 5B illustrates in side cross-sectional view the primary outer housing component for the portable personal computing device of FIG. 5A after this primary outer housing component has been allowed to cool for some time after the heated extrusion process. As shown, because the extrusion process is so hot, some amount of deformation or "wobble" can occur in the primary outer housing component 254b and its various corresponding parts and features 280b, 282b, 284b, 277b while they cools, since the hotter material is relatively weaker and softer. Although the amount of "wobble" shown may be exaggerated and not to scale, the end result is that the part tolerances that can be realized for such a shell or primary outer housing component formed using a heated extrusion process can range from about +/−0.2 millimeters in height and from about +/−0.2 millimeters in width.

Figure 6A:
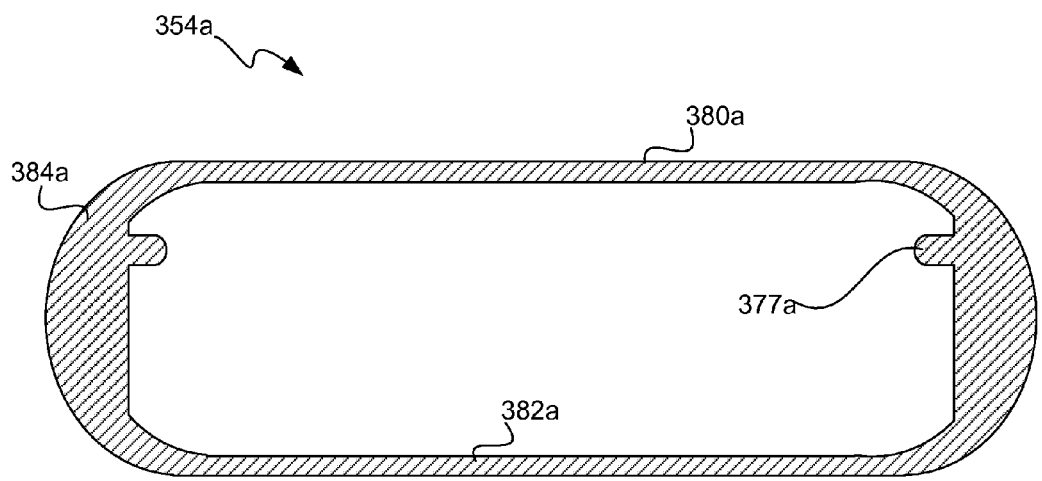
FIG. 6A illustrates in side cross-sectional view an exemplary primary outer housing component for a personal computing device immediately after the primary outer housing component has been through a cold-drawing process, according to one embodiment of the present invention.
Figure 6B:
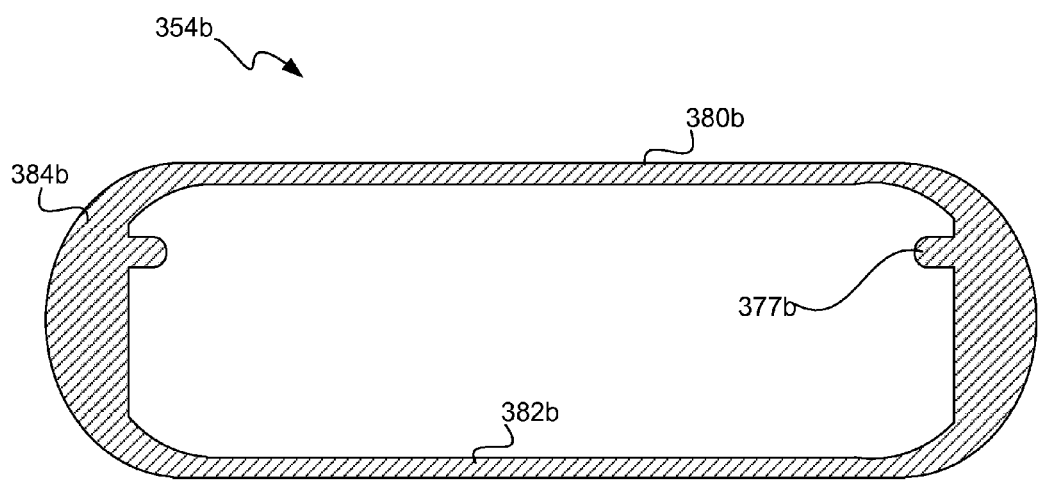
FIG. 6B illustrates in side cross-sectional view the primary outer housing component for a personal computing device of FIG. 6A at a significant amount of time after the cold-drawing process, according to one embodiment of the present invention.

Conversely, FIGS. 6A and 6B illustrate in side cross-sectional views the primary outer housing component 354 for a personal computing device immediately after the outer housing has been through a cold-drawing process and at a considerable amount of time thereafter, according to one embodiment of the present invention. As shown, a similar generally rectangular tubular-type primary outer housing component for a portable personal computing device (e.g., an iPod®) 354a can be formed using a cold-drawing material process. Similar to the foregoing example, primary outer housing component 354a can have a front wall 380a, a back wall 382a, side walls 384a and rails 377a, among other features. At a substantial period of time after the cold drawing formation process, the primary outer housing component 354b and its various corresponding parts and features 380b, 382b, 384b, 377b are substantially identical to the primary outer housing component 354a that was formed immediately after the cold drawing process. Because this cold-drawn housing component does not experience any significant wobble that tends to occur to a similar hot worked component, this results in an overall primary outer housing component 354 having tolerances that range from about +/−0.03 millimeters in height and about +/−0.03 millimeters in width. This is a significant improvement over housing components formed solely via a heated extrusion process.

Many cold-drawing processes involved simple shapes and dies, such as the formation of rods via a round hole in a die, as is generally known in the art. Because the present invention is concerned with forming a shape having a cross-section that is generally more complex, the use of more than a simple die may be preferable. For example, although the use of a die having a single opening can work the processed material such that its outer surface (i.e., outer cross-sectional circumference) is shaped as desired for the end product outer housing, the shape of the internal cavity and/or surface (i.e., inner cross-sectional circumference) may be less controlled. As such, an internal or inner mandrel can be used to shape the inner cavity and surface.

In one embodiment, the mandrel can be a "floating" mandrel that is not affixed to any structure or component. As the worked material is cold-drawn or pulled through the outer die opening, the floating mandrel is pulled into position and is self-centered by the friction of the pulled material as it moves through the outer die, as well as force from the outer die itself.

In another embodiment, the mandrel can be affixed to a structural component, such that its position with respect to the outer die remains constant. Such a stationary mandrel can be held in place by, for example, an elongated support or rod that extends longitudinally away from the die opening. Accordingly, the worked material can pass over the elongated support or rod and to the mandrel as it is being cold-worked.

In yet another embodiment, the inner mandrel can be a moving mandrel that is elongated with a smaller cross-section than the opening in the outer die through which the cold worked material is drawn. Such a moving mandrel can then be pulled through the die opening with the worked material. In such an embodiment, a lubricant may be used to enable the separation of the mandrel from within the cold-worked material (i.e., outer housing) after it has been formed.

In any of the foregoing embodiments involving a floating, affixed or moving mandrel, the mandrel can be specially shaped to assist in the formation of a complex inner surface or cross-sectional circumference. For example, where it is desired to have inner rails integrated with the primary outer housing component, a mandrel appropriately shaped to have grooves corresponding to where rails are desired can be used. In a particular example, where the desired cross-sectional shape of the primary outer housing component is to be that which is shown for primary outer housing component 154 in FIG. 3, an outer die (not shown) can be used having appropriate oval shape such that outer circumference or surface 190 is formed, while an inner mandrel can be used having a suitable smaller oval shape with two grooves formed therein such that inner circumference or surface 192 is formed.

In various embodiments, a rough shape or form of the outer housing might first be formed by using a conventional heated extrusion process, with the resulting rough shape or form then being reworked by using the preferable cold-drawing process. Such a two-phase process to form a tubular-type outer housing can result in less need for other processing steps that are typically required when only a heated extrusion process is used.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Although the present invention has been described primarily with respect to housings for electronic devices, it will be appreciated that housings or other parts for other non-electronic objects can similarly be formed by way of the present invention. Certain changes and modifications may be practiced, and it is understood that the invention is not to be limited by the foregoing details, but rather is to be defined by the scope of the appended claims.

What is claimed is:

1. A portable, handheld, personal computing device, comprising:
   a plurality of internal operational components located within an outer housing;
   a processor located within said outer housing and in communication with at least one of said plurality of internal operational components;

one or more user interfaces in communication with said processor;

a primary outer housing component that substantially surrounds and protects said plurality of internal operational components and said processor, said primary outer housing component including a single, continuous and seamless structural wall having a cross-sectional profile that includes an outer circumference and an inner circumference, wherein said primary outer housing component includes openings at a top end and bottom end thereof, and wherein said primary outer housing component is formed using a cold-drawing material process that includes the use of an outer die to form the shape of said outer circumference and a floating mandrel to form the shape of said inner circumference; and top and bottom end closures adapted to fit within and close off said top end and bottom end openings in said primary outer housing component.

2. The portable personal computing device of claim 1, wherein said primary outer housing component is formed from a metal.

3. The portable personal computing device of claim 1, wherein said cold-drawing process is performed at about room temperature.

4. The portable personal computing device of claim 1, wherein said primary outer housing component retains substantially the same shape at a time well after the cold-drawing process as its initial shape immediately after the cold-drawing process.

5. A portable, handheld, personal computing device, comprising:

a plurality of internal operational components located within an outer housing;

a processor located within said outer housing and in communication with at least one of said plurality of internal operational components;

one or more user interfaces in communication with said processor;

a primary outer housing component that substantially surrounds and protects said plurality of internal operational components and said processor, said primary outer housing component including a single, continuous and seamless structural wall having a cross-sectional profile that includes an outer circumference and an inner circumference, wherein said primary outer housing component includes openings at a top end and bottom end thereof, and wherein said primary outer housing component is formed using a cold-drawing material process that includes the use of an outer die to form the shape of said outer circumference and a mandrel to form the shape of said inner circumference, wherein the shape of said inner circumference includes one or more integrally formed rails that are adapted to assist with the assembly of said portable personal computing device; and top and bottom end closures adapted to fit within and close off said top end and bottom end openings in said primary outer housing component.

6. The portable personal computing device of claim 1, wherein said primary outer housing component includes one or more openings formed on a front or back surface thereof for the placement of one or more input or output components.

7. The portable personal computing device of claim 1, wherein said floating mandrel is positioned by the friction of worked material as it is pulled through said outer die, as well as force from said outer die.

8. The portable personal computing device of claim 1, wherein said mandrel is fixed in place during the cold-drawing process.

9. The portable personal computing device of claim 1, wherein said mandrel is a moving mandrel that is pulled through said outer die with worked material.

10. An outer housing component for a device, comprising:

a single, continuous, seamless and tubular-type structural wall adapted to substantially surround and protects a plurality of internal operational components for a device, said outer housing component having a cross-sectional profile that includes an outer circumference and an inner circumference, wherein the shape of said inner circumference includes one or more integrally formed rails that are adapted to assist with the assembly of said device; and openings at a top and bottom end thereof adapted for the acceptance of top and bottom closures, wherein said outer housing component is formed using a cold-drawing material process that includes the use of an outer die to form the shape of said outer circumference and a mandrel to form the shape of said inner circumference.

11. The outer housing component of claim 10, wherein said device is a portable, handheld, personal computing device.

12. The outer housing component of claim 10, wherein said primary outer housing component is formed from a metal.

13. The outer housing component of claim 10, wherein said cold-drawing process is performed at about room temperature.

14. The outer housing component of claim 10, further including:

one or more openings formed on a front or back surface thereof for the placement of one or more device components.

15. The outer housing component of claim 10, wherein said mandrel is a floating mandrel.

16. The outer housing component of claim 15, wherein said floating mandrel is positioned by the friction of worked material as it is pulled through said outer die, as well as force from said outer die.

17. The outer housing component of claim 10, wherein said mandrel is fixed in place during the cold-drawing process.

18. The outer housing component of claim 10, wherein said mandrel is a moving mandrel that is pulled through said outer die with worked material.

19. The outer housing component of claim 10, wherein the shape of said inner circumference is different than the shape of said outer circumference.

20. The portable personal computing device of claim 1, wherein the shape of said inner circumference is different than the shape of said outer circumference.

* * * * *

UNITED STATES PATENT AND TRADEMARK OFFICE
CERTIFICATE OF CORRECTION

| | | |
|---|---|---|
| PATENT NO. | : 7,894,185 B2 | Page 1 of 1 |
| APPLICATION NO. | : 12/242032 | |
| DATED | : February 22, 2011 | |
| INVENTOR(S) | : Douglas Weber et al. | |

It is certified that error appears in the above-identified patent and that said Letters Patent is hereby corrected as shown below:

On the first page, in field (56), in column 2, under "U.S. Patent Documents", line 6, after "Erike" delete "280/43.1" and insert -- 280/743.1 --, therefor.

Signed and Sealed this
Fifteenth Day of November, 2011

David J. Kappos
*Director of the United States Patent and Trademark Office*